United States Patent [19]

Williams

[11] Patent Number: 5,123,659
[45] Date of Patent: Jun. 23, 1992

[54] GAME BALL

[75] Inventor: Donald E. Williams, Glendale Heights, Ill.

[73] Assignee: Wilson Sporting Goods Co., River Grove, Ill.

[21] Appl. No.: 660,898

[22] Filed: Mar. 1, 1991

[51] Int. Cl.$^5$ .................... A63B 37/12; A63B 37/06
[52] U.S. Cl. .................... 273/60 B; 273/DIG. 22; 264/46.9
[58] Field of Search .............. 273/60 R, 60 A, 60 B, 273/DIG. 22, 65 EE, 65 EF, 65 ED, 58 J

[56] References Cited

U.S. PATENT DOCUMENTS

| | | | |
|---|---|---|---|
| 2,743,931 | 5/1956 | Pooley | 273/60 B |
| 2,776,139 | 1/1957 | Blamey, Jr. | 273/60 B |
| 3,069,170 | 12/1962 | Dillon, Jr. | 273/60 B |
| 3,652,088 | 3/1972 | Marsh | 273/58 C X |
| 3,819,768 | 6/1974 | Molker | 273/218 X |
| 3,976,295 | 8/1976 | Heald, Jr. | 273/60 B |
| 4,144,297 | 3/1979 | Tomar | 273/60 B X |
| 4,149,720 | 4/1979 | Heald, Jr. | 273/60 R |
| 4,203,941 | 5/1980 | Brooker | 273/60 B |
| 4,211,407 | 7/1980 | Tomar | 273/60 B |
| 4,238,537 | 12/1980 | Kerr | 273/60 B X |
| 4,267,217 | 5/1981 | Brooker | 273/58 A |
| 4,364,565 | 12/1982 | Tomar | 273/60 R |
| 4,367,873 | 1/1983 | Chang | 273/60 R |
| 4,463,951 | 8/1984 | Kumasaka | 273/58 A |
| 4,498,667 | 2/1985 | Tomar | 273/60 B |
| 4,529,200 | 7/1985 | Miller | 273/60 B |
| 4,568,083 | 2/1986 | Miller | 273/60 B |
| 4,572,507 | 2/1986 | Hubbert et al. | 273/60 R |
| 4,598,909 | 7/1986 | Ventura et al. | 273/60 B |
| 4,610,071 | 9/1986 | Miller | 273/60 A X |
| 4,653,752 | 3/1987 | Miller | 273/60 B |
| 4,660,830 | 4/1987 | Tomar | 273/60 B |
| 4,861,028 | 8/1989 | Williams | 273/60 B |
| 4,884,814 | 12/1989 | Sullivan | 273/235 R |
| 4,911,451 | 3/1990 | Sullivan | 273/235 R |

FOREIGN PATENT DOCUMENTS 632220 12/1961 Canada .............. 273/60 B

OTHER PUBLICATIONS

"Improved Technology of Rotationally Molded Foam Brings New Applications," Plastics Engineering, Nov. 1982, pp. 37–39.

Primary Examiner—George J. Marlo

[57] ABSTRACT

A game ball is made by rotationally molding a hollow spherical shell from a blend of foamed ionomer resins (Surlyn 9450 and Surlyn 8528) and low density polyethylene resin. The center of the hollow spherical core may be filled with foamed polyurethane, and the spherical core may be covered by a leather cover. If desired, hollow ceramic microspheres or beads can be added to the resins before molding.

8 Claims, 9 Drawing Sheets

GAME BALL

BACKGROUND

This invention relates to game balls, and, more particularly, to a game ball with a spherical core formed from a blend of a foamed mixture of ionomer resins and low density polyethylene.

This invention is an improvement over the game balls described in my prior U.S. Pat. No. 4,861,028. As described in my prior patent, soft balls have historically been made by forming a spherical core of cork, kapok, or similar material which is bound together. A layer of windings of string or yarn is wrapped over the core and a leather cover is placed over the windings and stitched together.

In recent years, game balls, particularly softballs, have been made from molded plastic cores. For example, U.S. Pat. No. 4,149,720 describes a ball which includes a foamed polyurethane core and a leather cover. U.S. Pat. No. 4,364,565 describes a ball which includes a spherical core made from foamed ethylene vinyl acetate copolymer and Surlyn, an ionic copolymer which is available from E. I. DuPont de Nemours and Co. (DuPont) U.S. Pat. No. 4,610,071 describes a ball which includes a core which is molded from Nucrel (ethylene acid copolymer) and filled with polyurethane. A cover is sewn over the core. U.S. Pat. No. 3,069,170 describes a ball which includes a core of foamed polyethylene and a cover. U.S. Pat. No. 4,463,951 describes a ball which is made by rotationally molding an outer layer of foamed polyvinyl chloride and injecting polyurethane foam into the cavity.

The following U. S. Pat. Nos. describe balls which are formed from Surlyn: 4,572,507, 4,529,200, 4,568,083,and 4,653,752.

Specifications for softballs have been issued by two governing organizations, the United States Slow-pitch Softball Association (USSSA) and the Amateur Softball Association (ASA). The specifications of the USSSA in effect before 1989 permitted 11 and 12 inch softballs to have a coefficient of restitution (COR) ranging from 0.44 or under to 0.52, depending upon the category or class in which the ball was used. Different categories would be indicated for example, by the color of the stitching on the cover. Beginning in 1989 the COR of USSSA licensed balls could not exceed 0.50.

Coefficient of restitution (COR) is one measure of the liveliness of the ball. COR is measured by propelling a ball against a hard surface at 60 mph (88 fps) and measuring the rebound speed of the ball. COR is expressed in terms of the ratio of the rebound speed to 60 mph (88 fps).

Other qualities of softballs are important which are not included in the foregoing "official" specifications. These qualities include the sound of the ball when batted, texture of the ball, the "feel off the bat" or, the feel which the batter experiences at the moment of impact, flight distance and consistency, and durability.

My prior U.S. Pat. No. 4,861,028 describes a softball which includes a hollow core which is formed by rotationally molding low density polyethylene or a mixture of low density polyethylene and an ethylene acid copolymer. The specific ethylene acid copolymer described is available from DuPont under the name Nucrel. The low density polyethylene used is sold by the USI Division of Quantum Chemical Corporation under the designation Microthene MN718 and has a density of 0.915 grams/cc and a flexural modulus of 20.6 kpsi (1000 pounds per square inch). The softballs formed in accordance with my prior patent have not been well received. Those softballs did not carry as well as solid core balls, and the hollow balls had a tendency to fracture when played in temperatures below 40° F.

SUMMARY OF THE INVENTION

I have found that rotationally molding a blend of two different Surlyns (ionomer resins available from DuPont) substantially improves the performance of the core. The core can be further improved by adding a minor amount of low density polyethylene (LDPE), e.g., from 15 to 30% by weight, and a chemical blowing agent (CBA). The LDPE preferably has a density within the range of about 0.910 to 0.940 gm/cc. The LDPE serves as a compounding grinding agent and reduces the cost of an all-Surlyn core. The blowing agent forms a foamed core, and the thickness of the core wall is substantially greater than the thickness of the unfoamed core, thereby decreasing the size of the hollow interior. The foamed core also has greater resistance to deformation and plays and feels more like a solid core. The amounts of the Surlyn, the low density polyethylene, and the blowing agent can be varied as desired to vary the COR and the compression resistance (feel). The COR can be lowered and compression resistance can be improved by adding hollow ceramic microspheres. The hollow core can be filled with foamed polyurethane if desired.

DESCRIPTION OF THE DRAWING

The invention will be explained in conjunction with illustrative embodiments shown in the accompanying drawings, in which —

DESCRIPTION OF SPECIFIC EMBODIMENTS

Figure 1:
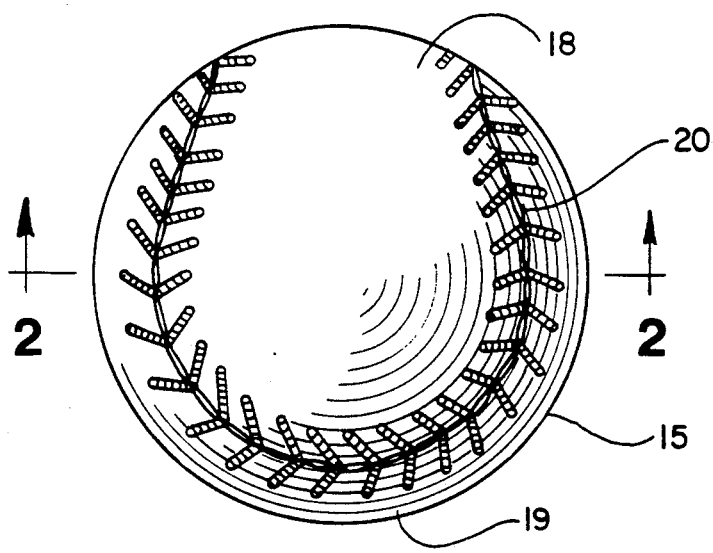
FIG. 1 illustrates a softball formed in accordance with the invention.
Figure 2:
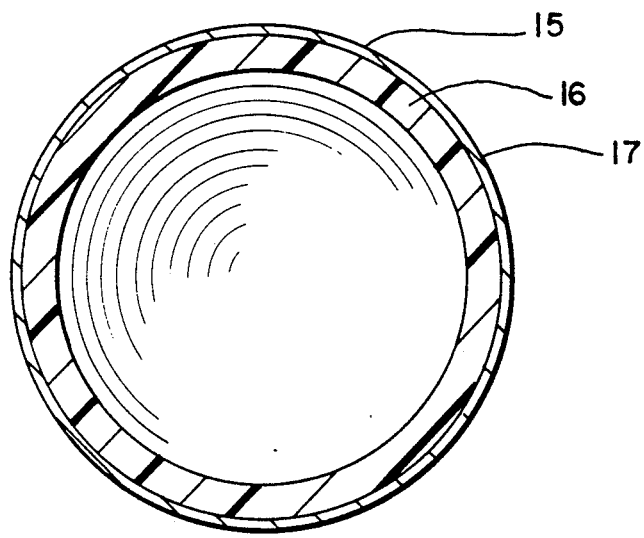
FIG. 2 is a sectional view of the softball formed with a hollow spherical core.

The invention will be explained in conjunction with a softball 15. The particular softball illustrated in the drawings is a 12 inch circumference softball, but it will be understood that the invention can be used with other sizes of balls, for example, 9 and 11 inch circumference balls, and with other game balls with and without covers.

The softball 15 includes a hollow spherical core or shell 16 and a cover 17 which surrounds the core or shell. The cover is formed from two dumbbell-shaped pieces 18 and 19 which are stitched or sewn together along seams 20. The cover can be formed from leather, vinyl, or similar material which can be used to simulate the look and feel of leather covers. For a 12 inch softball the outside diameter of the core or shell is within the range of 3.66 to 3.70inches, and the cover thickness is about 0.05 to 0.06 inch. The wall thickness of the core or shell can be within the range of about 0.36to 0.56 inch.

The core or shell 16 is formed from a blend of foamed resins, namely two different Surlyns (ionomer resins available from DuPont) and low density polyethylene resin. The preferred procedure for forming the core is rotational molding. Rotational molding is a well known art, and a detailed description of the procedure is unnecessary. The plastic resins are introduced into a mold, and the mold is rotated biaxially in a heated chamber. The mold is rotatably mounted on a spindle, and the mold is rotated by the spindle while the spindle is rotated about an axis which is perpendicular to the axis of the spindle.

In rotational molding, there are essentially four basic steps: loading, molding or curing, cooling and unloading. In the loading step, either liquid or powdered polymer material is charged into a hollow mold. The mold halves are then closed and moved into an oven where the loaded mold spins biaxially. Rotation speeds should be variable at the heating station.

In the oven, the heat penetrates the mold, causing the polymer material, if it is in powder form, to melt and conform to the mold surface, or if it is in liquid form, to start to gel. The heating is usually accomplished by air or by a liquid of a high specific heat, such as molten salt or where jacketed molds are used, by a liquid medium such as oil.

As the molds are heated in the oven, they continue to rotate so that the polymer material will gradually become distributed evenly on the molded cavity through centrifugal force. As the heating continues, the polymer material melts completely forming a homogeneous layer of molten plastic.

When the parts have been formed, the molds are transferred to a cooling chamber where cooling is accomplished by any means, preferably cold water spray or forced cold air. During cooling, the mold continues to rotate so that there are no distortions formed in the surface of the molded product. Lastly, the molds are opened and the parts removed either by manual or mechanical means.

In forming game balls in accordance with the preferred embodiment of the invention, the mold is loaded with a blend of Surlyns, low density polyethylene (LDPE) resin, and a blowing agent. It is believed that Surlyn has not heretofore been rotomolded because Surlyn resin is not readily available in powder form and cannot be air ground. The LDPE serves as a compounding/grinding aid and also reduces the cost of an all-Surlyn ball. The LDPE is extrusion blended with the Surlyns, and the blend is ground into a powder.

The preferred ball used 17% by weight Surlyn 8528 from DuPont, 68% by weight Surlyn 9450 from DuPont, and 15% NA 117LDPE in pellet form from the USI Division of Quantum Chemical Corporation. The comparable powder form of LDPE is MN-718. The chemical blowing agent (CBA) is a modified azodicarbonamide available from Uniroyal Chemical Company under the designation Celogen AZ 2990. The amount of the blowing agent is preferably in the range of 0.35 to 0.50 parts per hundred of the total of Surlyn and LDPE resins. The blowing agent expands the wall thickness of the core and makes the ball play and feel more like a solid ball.

As will be explained hereinafter, the COR and compression resistance of the core can be varied by changing the ratio of Surlyn 8528 to Surlyn 9450. The core can be further improved by adding beads or microspheres to the resins in an amount of up to 10% of the total weight of the core. The preferred microspheres are available from Zeelan Industries of St. Paul, Minn. under the designation Z-Light W-1000. The microspheres are hollow silica-alumina ceramic alloy spheres having a diameter of 10 to 150 microns, a specific gravity of 0.7 to 0.9 g/cc, a hardness of Mohs Scale 5, and a compressive strength of 5000 psi. The microspheres increase the wall thickness of the core, lower the COR and I.V. (initial velocity), increase hardness slightly, and reduce the deformation (compression resistance) under a 400 pound load, especially at 100 degrees.

Figure 3:
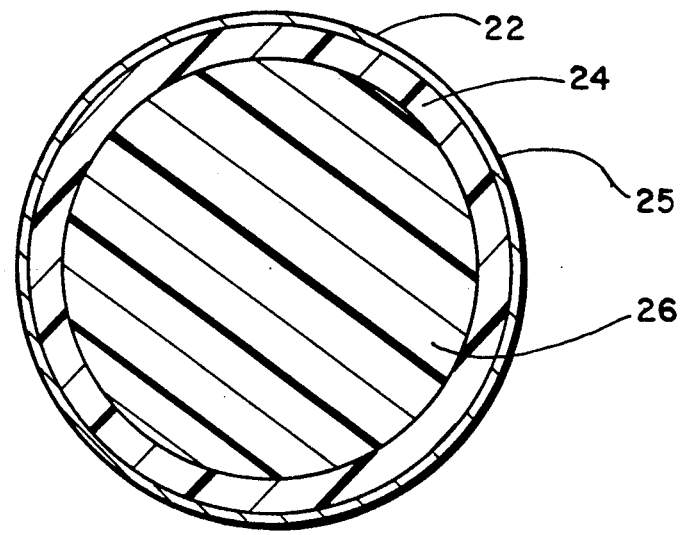
FIG. 3 is a sectional view of a softball formed from a spherical core which is filled with polyurethane foam.

FIG. 3 illustrates another 12 inch circumference softball 22 which includes a spherical core 24 formed in the same way as the core 16 and a cover 25. The center of the molded core is filled with low density polyurethane foam 26. The PU foam makes a three-piece ball —the core, the cover, and the PU center — and makes the ball play and feel more like a solid ball. The PU foam also prevents rattles if small pieces of the core break off during repeated impacts. The particular PU used is SWD-760-2, a two-part liquid polyurethane sold by SWD Urethane Co. of Mesa, Ariz. The molded core is provided with a suitable opening for introducing the mixed polyurethane components, which foam in place inside the core.

Surlyn resins are ionic copolymers which are the sodium or zinc salts of the reaction product of an olefin having from 2to 8 carbon atoms and an unsaturated monocarboxylic acid having from 3 to 8 carbon atoms. The carboxylic acid groups of the copolymer may be totally or partially neutralized. Surlyn resins and the method of producing Surlyn resins are explained in detail in Rees U.S. Pat. No. 3,264,272.

Surlyn 8528 is a sodium Surlyn and has the physical properties set forth in Table I. Surlyn 9450 is a zinc Surlyn and has the physical properties set forth in Table II.

TABLE I

| | | |
|---|---|---|
| Density - g/cc: | .94 | ASTM D 792 |
| Melt Index - dg/min: | 1.3 | ASTM D 1238 |
| Tensile - KPSI: | 1.8 | ASTM D 638 |
| Elongation - %: | 450 | ASTM D 638 |
| Flex Modulus - KPSI: | 32 | ASTM D 790 |
| Hardness - Shore D: | 60 | ASTM D 2240 |
| Vicat Softening - Deg. C: | 73 | ASTM D 1525 |

All of the above values are nominal: Measured values should be within 10% of the nominal values. Note: Melt index is highly influenced by moisture content and should be run on a sample from an unopened bag.

TABLE II

| | | |
|---|---|---|
| Density - g/cc: | .94 | ASTM D 792 |
| Melt Index - dg/min: | 5.5 | ASTM D 1238 |

TABLE II-continued

| Tensile - KPSI: | 1.2 | ASTM D 638 |
|---|---|---|
| Elongation - %: | 500 | ASTM D 638 |
| Flex Modulus - KPSI: | 19 | ASTM D 790 |
| Hardness - Shore D: | 54 | ASTM D 2240 |
| Vicat Softening - Deg. C: | 79 | ASTM D 1525 |

All of the above values are nominal: Measured values should be within 10% of the nominal values. Note: Melt index is highly influenced by moisture content and should be run on a sample from an unopened bag.

Low density polyethylene sold under the designation NA 117 has the physical properties set forth in Table III.

TABLE III

| Density - g/cc: | .915 | ASTM D 792 |
|---|---|---|
| Melt Index - dg/min: | 8 | ASTM D 1238 |
| Tensile - KPSI: | 1.7 | ASTM D 638 |
| Elongation - %: | 525 | ASTM D 638 |
| Flex Modulus - KPSI | 20.6 | ASTM D 790 |
| Hardness Shore D: | 48 | ASTM D 2240 |
| Vicat Softening - Deg. C: | 88 | ASTM D 1525 |

All the above values are nominal: Measured values should be within 10% of the nominal values.

One blend of resins used to make softballs in accordance with the invention used 17% by weight of Surlyn 8528, 68% by weight of Surlyn 9450, and 15% by weight of LDPE. This blend is called Blend X. Twelve inch softballs made from foamed Blend X cores were compared with commercial softballs sold under the names Red Dot and Thunder. The results are set forth in Table IV.

TABLE IV

| Ball | Weight (grams) | Size (inches) | COR at 80° F. | Deformation @ 400 lbs. (inches) at 80° F. | at 100° F. | I.V. (feet/sec.) at 80° F. | Carry Distance (feet) at 80° F. | at 100° F. |
|---|---|---|---|---|---|---|---|---|
| Blend X | 197.9 | 12.01 | 0.517 | 0.286 | 0.472 | 137.4 | 353 | 361 |
| Red Dot | 179.6 | 11.87 | 0.482 | 0.241 | 0.278 | 136.1 | 338 | 340 |
| Thunder | 180.3 | 11.91 | 0.501 | 0.29 | 0.408 | 137.7 | 347 | 358 |

Figure 4:
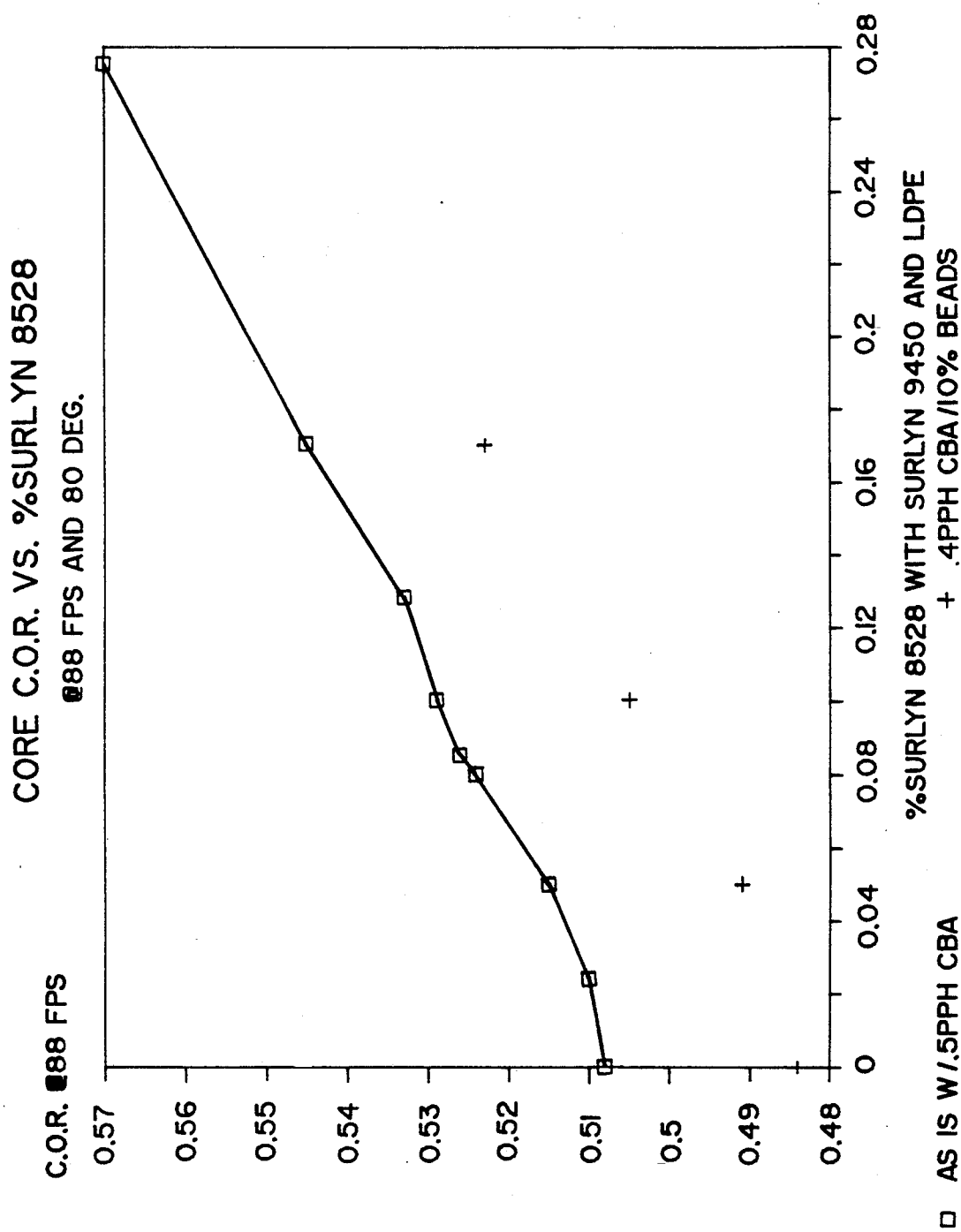
FIG. 4 is a graph showing the COR of hollow cores using varying amounts of Surlyn 8528 and Surlyn 9450 and 15% by weight low density polyethylene.

FIG. 4 shows the effect of varying the percentages of Surlyn 8528 and Surlyn 9450 on the COR of the core. All cores had a total Surlyn content of 85% by weight of the total resin weight and 15% by weight LDPE. The data indicated by a square is for cores which also included 0.5 pph blowing agent. The data indicated by an + is for cores which included 0.4 pph resin blowing agent and 10% by weight of the core of Z-Light ceramic beads or microspheres.

Figure 5:
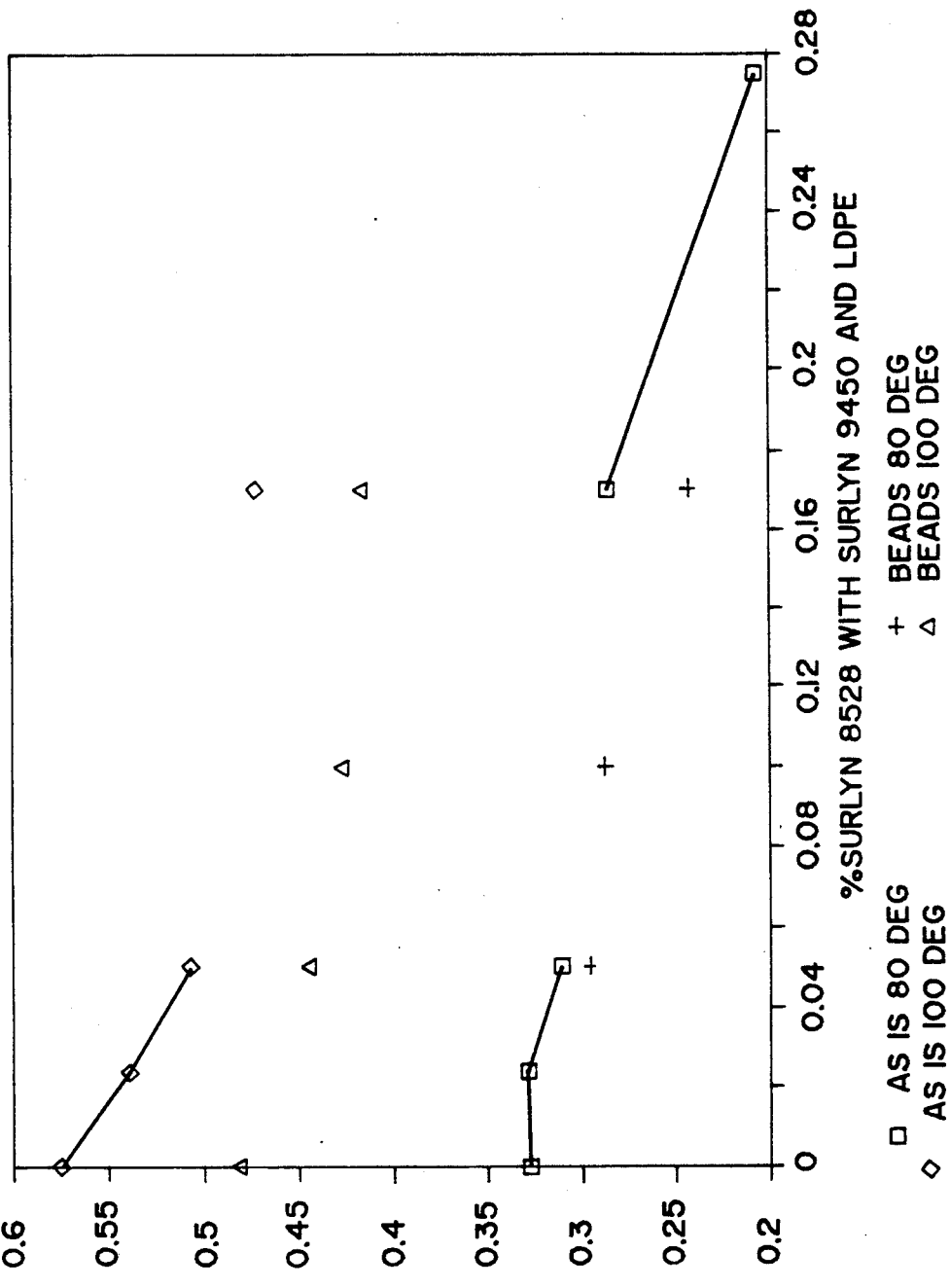
FIG. 5 is a graph showing the compression resistance of hollow cores using varying amounts of Surlyn 8528 and 9450.

FIG. 5 shows the effect of varying the amounts of Surlyn 8528 and Surlyn 9450 on the compression resistance of the core. All cores had a total Surlyn content of 85% by weight of the total resin weight and 15% by weight LDPE. The cores were made with and without ceramic beads as indicated. The amount of beads is indicated as percent by weight of the total weight of the core, including the beads.

Figure 6:
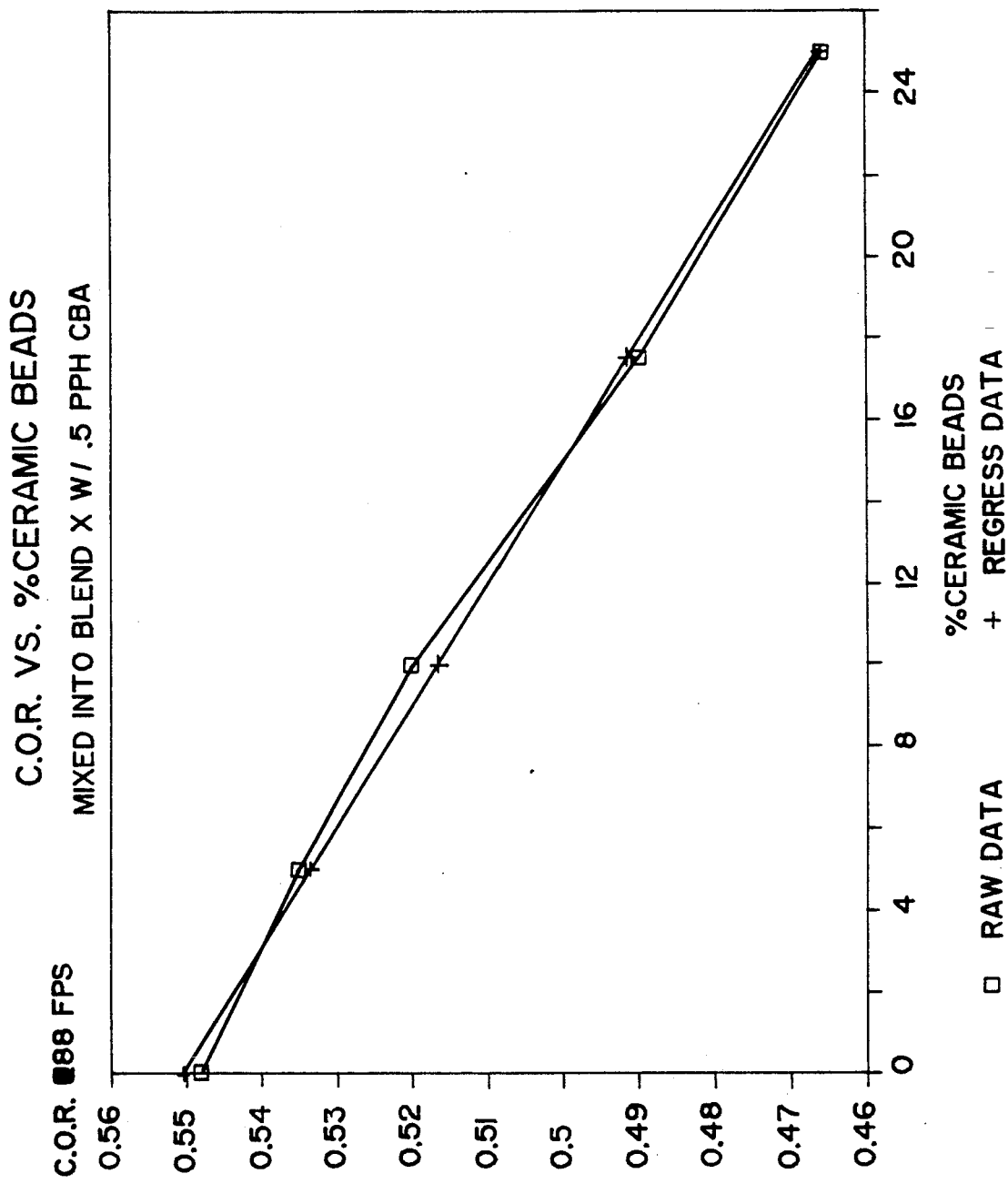
FIG. 6 is a graph showing the COR of hollow cores using varying amounts of ceramic microspheres.
Figure 7:
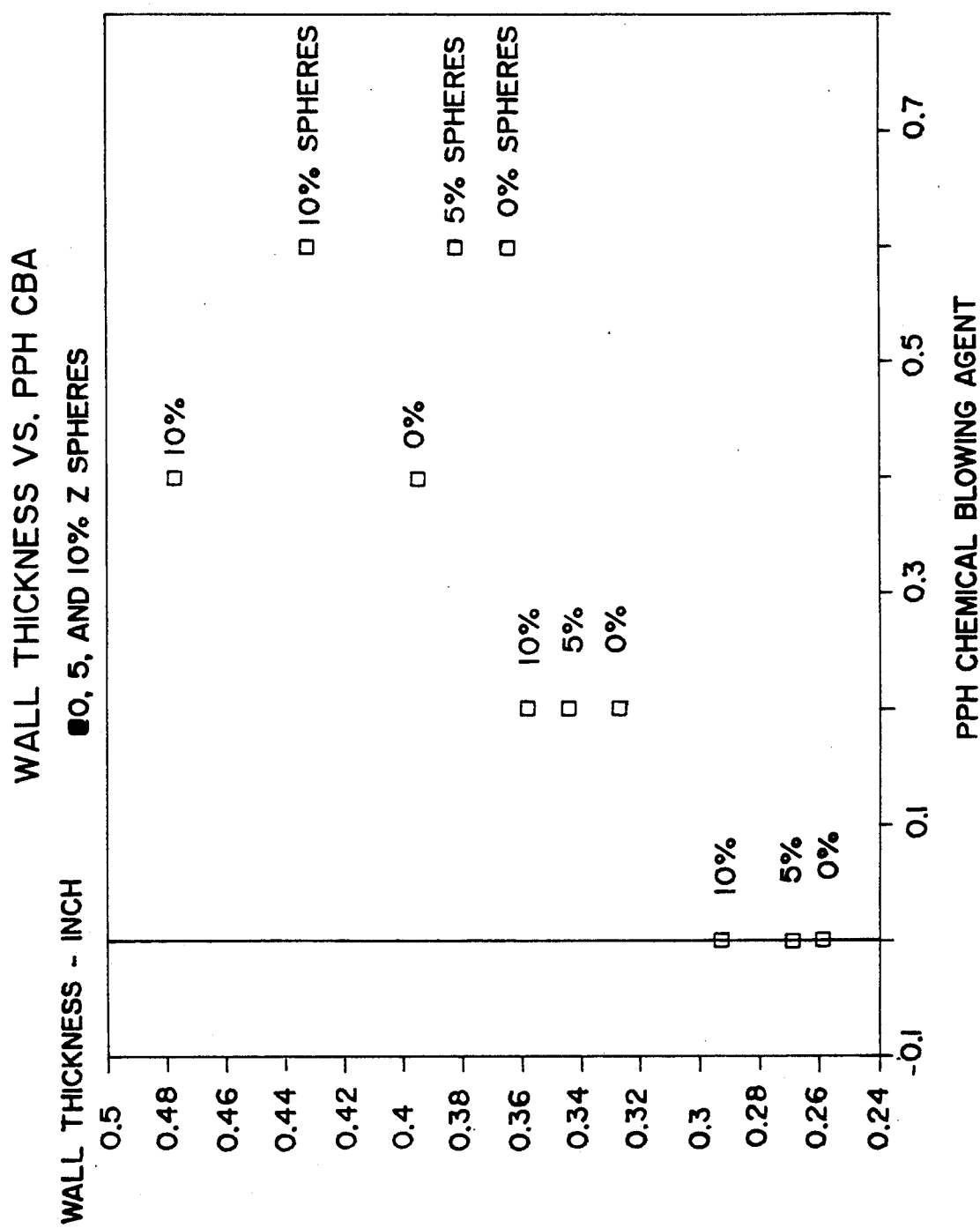
FIG. 7 is a graph showing the effect of the amount of chemical blowing agent on the wall thickness of the core.
Figure 8:
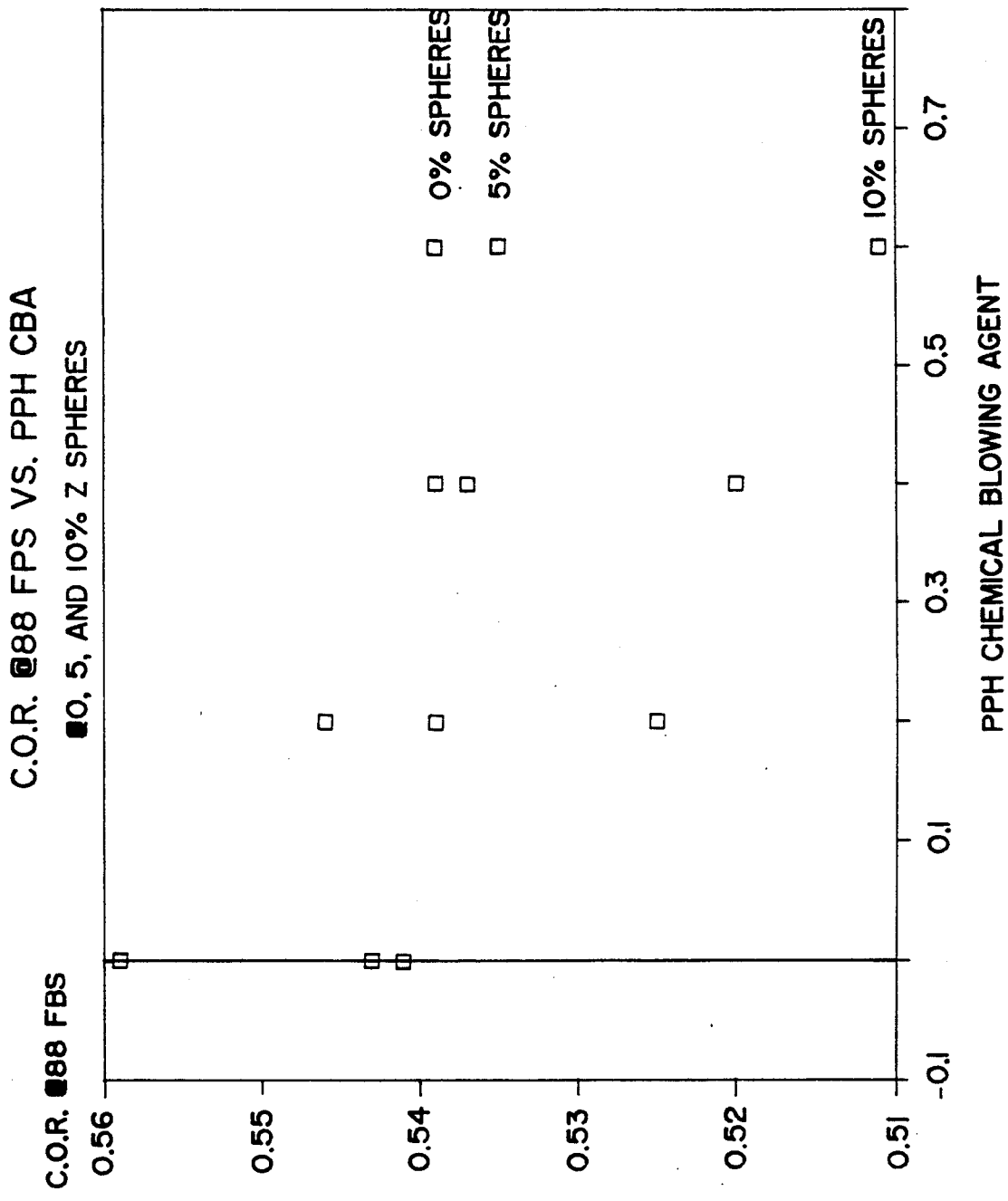
FIG. 8 is a graph showing the effect of the amount of blowing agent on the COR of the core.
Figure 9:
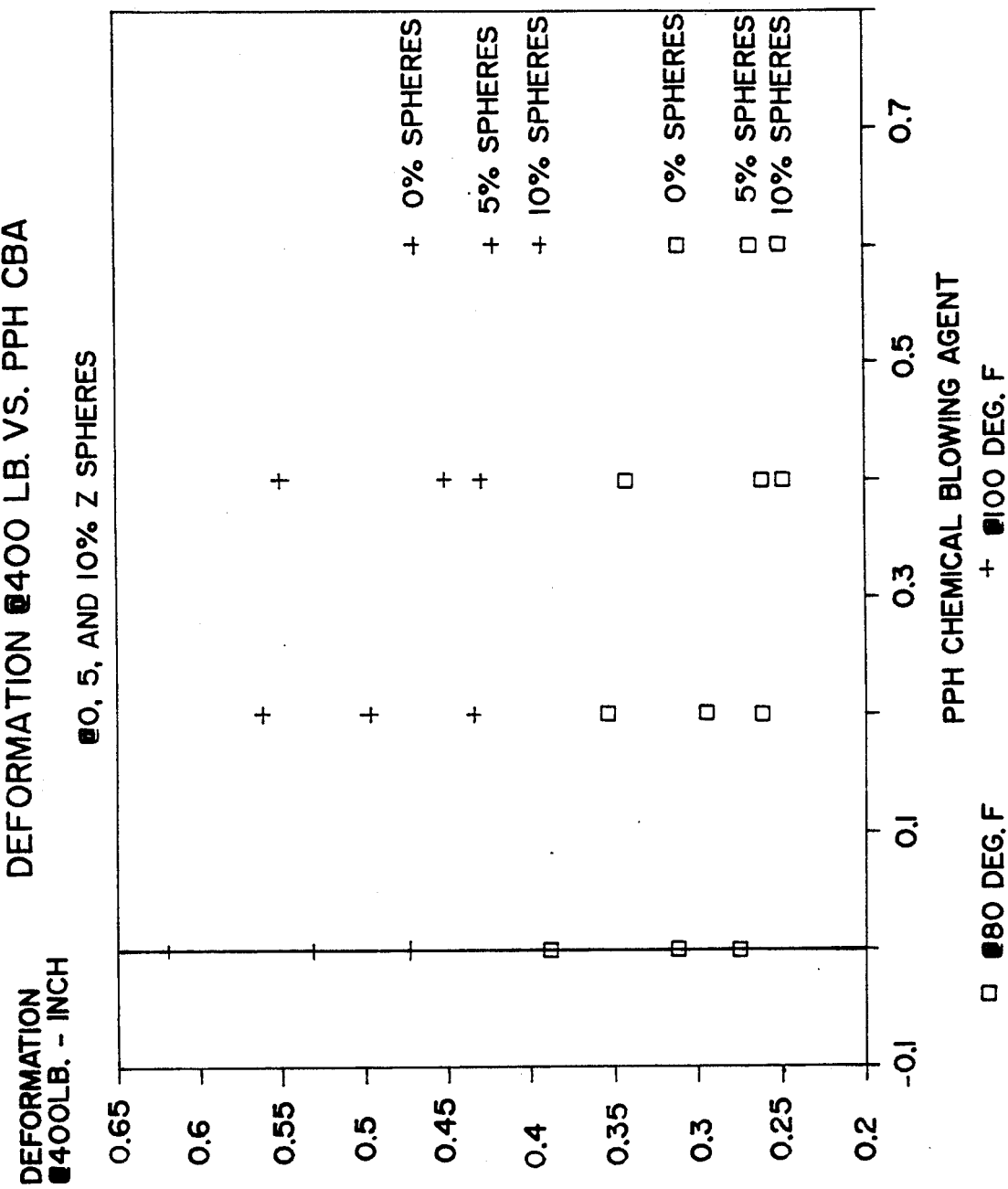
FIG. 9 is a graph showing the effect of the amount of blowing agent on the deformation of the core.
Figure 10:
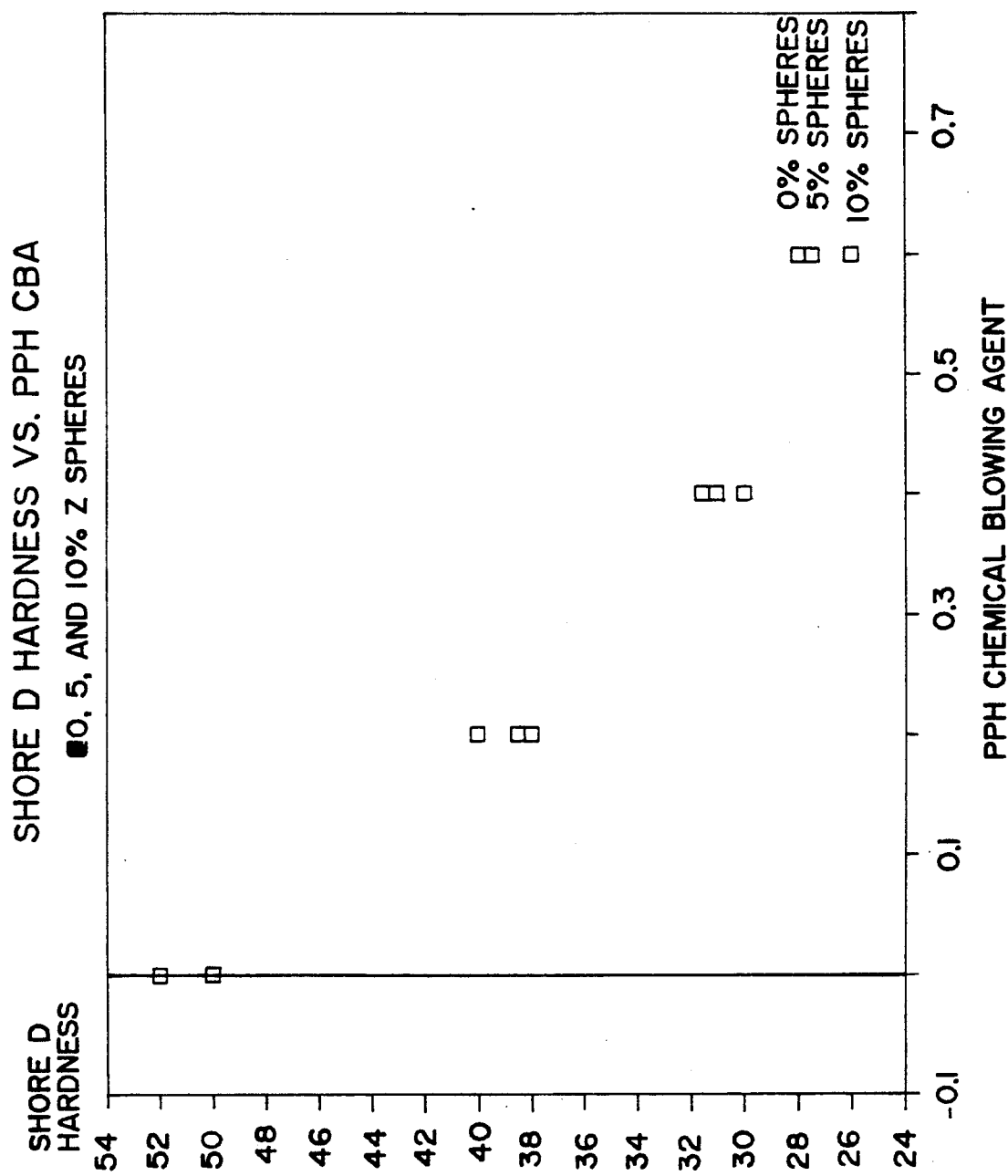
FIG. 10 is a graph showing the effect of the amount of blowing agent on the Shore D hardness of the core.
Figure 11:
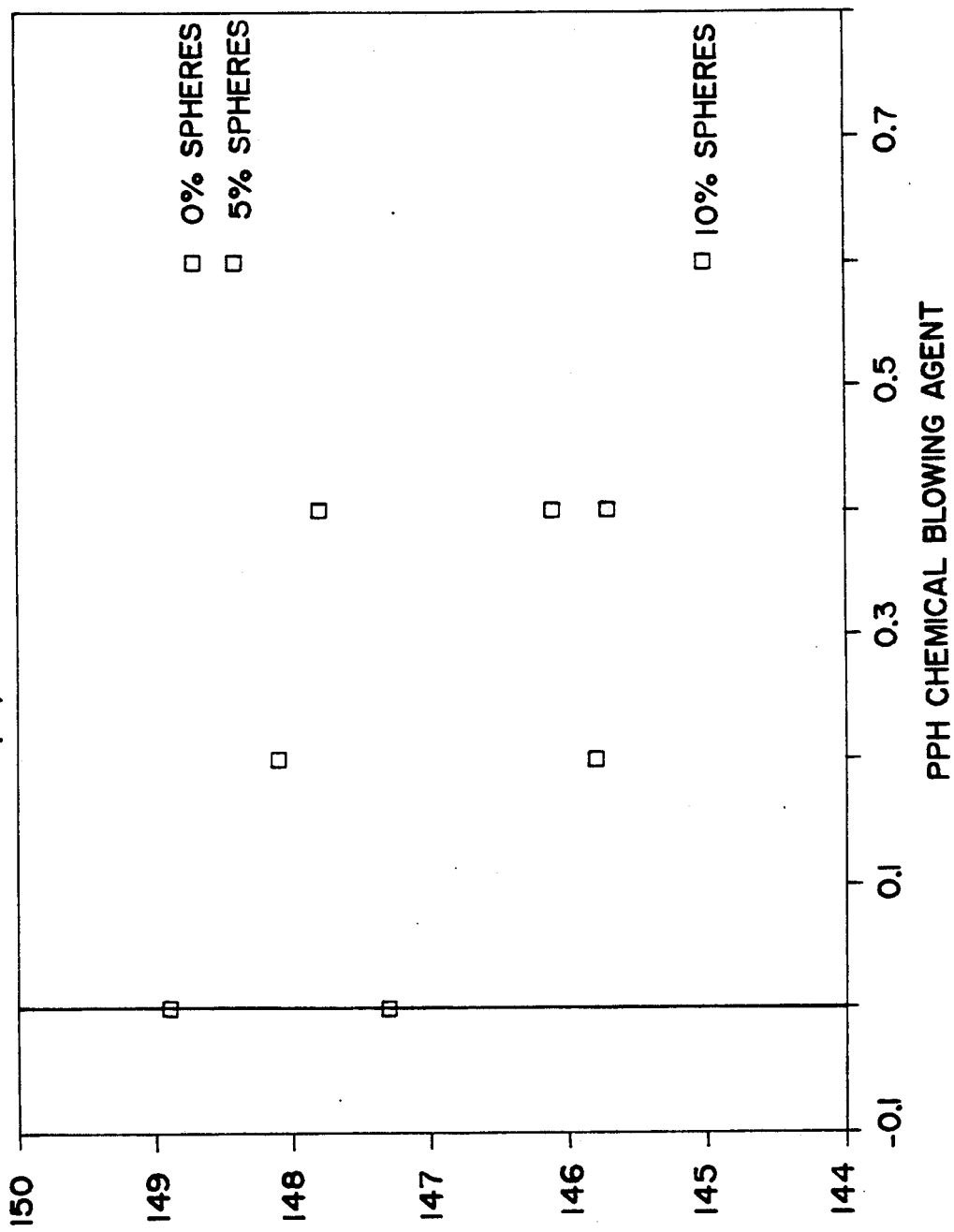
FIG. 11 is a graph showing the effect of the amount of blowing agent on the initial velocity of the core.

FIG. 6 shows the effect of the amount of ceramic beads on the COR of the core. The cores were made from Blend X with 0.5 ppH blowing agent.

FIGS. 7 through 11 show the effect of the amount of blowing agent on various properties of the core with 0, 5, and 10% by weight of ceramic beads.

Table V is a matrix which shows the effect of varying amounts of blowing agent and Z Light ceramic beads on the physical properties of cores made from Blend X.

TABLE V

| Z Light Level | Blowing Agent Level PPH | 0 | 0.2 | 0.4 | 0.6 |
|---|---|---|---|---|---|
| 0% | Weight - gms. | 152.3 | 150.6 | 151 | 149.4 |
| | Size - in. circ. | 11.51 | 11.51 | 11.5 | 11.49 |
| | Wall thickness - inch | 0.259 | 0.327 | 0.395 | 0.36 |
| | Deform. @ 400 lb. | | | | |
| | @ 80 deg - inch | 0.389 | 0.355 | 0.343 | 0.311 |
| | @ 100 deg - inch | 0.619 | 0.561 | 0.551 | 0.469 |
| | Shore D Hardness | 50 | 38 | 30 | 26 |
| | C.O.R. @ 88 FPS | 0.559 | 0.546 | 0.539 | 0.539 |
| | I.V. @ 2.4 turns - FPS | 148.9 | 148.1 | 147.8 | 148.7 |
| 5% | Weight - gms. | 152.9 | 152.1 | 150.9 | 150.3 |
| | Size - in. circ. | 11.5 | 11.51 | 11.5 | 11.49 |
| | Wall thickness - inch | 0.293 | 0.344 | 0.395 | 0.382 |
| | Deform. @ 400 lb. | | | | |
| | @ 80 deg - inch | 0.312 | 0.295 | 0.262 | 0.268 |
| | @ 100 deg - inch | .532 | .496 | .451 | .421 |
| | Shore D Hardness | 52 | 38.5 | 31.5 | 27.5 |
| | C.O.R. @ 88 FPS | 0.533 | 0.539 | 0.537 | 0.535 |
| | I.V. @ 2.4 turns - FPS | — | — | 145.7 | 148.4 |
| 10% | Weight - gms. | 152.4 | 150.5 | 149.3 | 147.4 |
| | Size - in. circ. | 11.51 | 11.51 | 11.49 | 11.51 |
| | Wall thickness - inch | 0.269 | 0.358 | 0.477 | 0.432 |
| | Deform. @ 400 lb. | | | | |
| | @ 80 deg - inch | 0.275 | 0.262 | 0.249 | 0.251 |
| | @ 100 deg - inch | 0.473 | 0.434 | 0.429 | 0.393 |
| | Shore D Hardness | 52 | 40 | 31 | 29 |
| | C.O.R. @ 88 FPS | 0.543 | 0.525 | 0.52 | 0.511 |
| | I.V. @ 2.4 turns - FPS | 147.3 | 145.8 | 146.1 | 145.0 |

Physical properties of softballs made from cores of two additional blends are set forth in Table VI. Blend X 0.4/10 was Blend X with 0.4 pph blowing agent and 10% Z Light beads. Blend 10.10 was 10% Surlyn 8528, 75% Surlyn 9450, 15% LDPE, 0.4 pph blowing agent, and 10% Z-Light beads.

TABLE VI

| Ball | Weight (grams) | Size (inches) | COR @ 80° F. | Deformation @ 400 lbs. (inches) @ 80° F. | 100° F. | I.V. (feet/sec.) @ 80° F. | Carry Distance (feet) @ 80° F. |
|---|---|---|---|---|---|---|---|
| .4/10 | 186.7 | 11.9 | 0.507 | 0.269 | 0.411 | 137.6 | 358 |
| 10.10 | 189.7 | 11.91 | 0.492 | 0.318 | 0.472 | 136.2 | 340 |

Table VII compares commercial Thunder and Red Dot softballs with softballs formed in accordance with the invention using 15, 20, 23, and 25% LDPE and varying amounts of Surlyn. The Thunder, Red Dot, and Blend X balls in Table VII are not the same balls which were tested in Table IV. The balls in Table VII were not tested for carry distance.

TABLE VII

| Ball | Weight (grams) | Size (inches) | Deformation @ 400 lbs. (inches) | | COR at 80° F. | I.V. (feet/sec.) at 80° F. |
| --- | --- | --- | --- | --- | --- | --- |
| | | | at 80° F. | at 100° F. | | |
| Thunder | 170.2 | 11.89 | 0.310 | 0.480 | 0.494 | 139.1 |
| Red Dot | 180.9 | 11.81 | 0.241 | 0.301 | 0.471 | 135.8 |
| Blend X | 187.8 | 12.01 | 0.294 | 0.460 | 0.525 | 139.3 |
| 200 | 187.2 | 11.87 | 0.297 | 0.469 | 0.468 | 134.0 |
| 212 | 190.9 | 11.91 | 0.260 | 0.411 | 0.493 | 135.6 |
| 215 | 187.8 | 11.88 | 0.255 | 0.412 | 0.497 | 136.0 |

| | Blend 200 | Blend 212 | Blend 215 |
| --- | --- | --- | --- |
| Surlyn 8528 | 0% | 12% | 15% |
| 9450 | 80 | 65 | 60 |
| LDPE | 20 | 23 | 25 |
| CBA | 0.4 PPH | 0.4 PPH | 0.4 PPH |
| Z Spheres | 9 | 9 | 9 |

Although I have found that a blend of Surlyn 8528 and Surlyn 9450 produces superior results, it is possible that other Surlyns could provide comparable results. Using two different Surlyns allows for varying certain physical properties of the ball as desired by varying the ratio of the Surlyns.

The ceramic beads reduce the compression resistance under a 400 pound load, especially at 100° F. It is believed that compression resistance is related to what players describe as "feel". A more compressible ball feels heavy and is not perceived as lively. A less compressible ball feels light and "jumps" off the bat.

While in the foregoing specification detailed descriptions of specific embodiments of the invention were set forth for the purpose of illustration, it will be understand that many of the details herein given may be varied considerably by those skilled in the art without departing from the spirit and scope of the invention.

I claim:

1. A game ball comprising a molded spherical shell having a spherical inside surface and a spherical outside surface which define a wall thickness, the shell being formed from a first ionomer resin which is a metal salt of the reaction product of an olefin having from 2 to 8 carbon atoms and an unsaturated monocarboxylic acid having from 3 to 8 carbon atoms, a second ionomer resin which is a different metal salt of the reaction product of an olefin having from 2 to 8 carbon atoms and an unsaturated monocarboxylic acid having from 3 to 8 carbon atoms, the total amount of the first and second resins being about 70 percent to 85 percent of the total amount of resin, and low density polyethylene in the amount of 15 to 30 percent of the total amount of resin.

2. The game ball of claim 1 in which the metal of the first resin is sodium and the metal of the second resin is zinc.

3. The game ball of claim 2 in which said first ionomer resin is present in an amount of about 10 percent to 20 percent of the total amount of resin and said second ionomer resin is present in an amount of about 65 percent to 75 percent of the total amount of resin.

4. The game ball of claim 2 in which said first ionomer resin is present in an amount of about 17 percent of the total amount of resin, said second ionomer resin is present in an amount of about 68 percent of the total amount of resin, and said low density polyethylene is present in an amount of about 15 percent of the total amount of resin.

5. The game ball of claim 1 in which said shell further includes about 0.35 to 0.50 parts of blowing agent per 100 parts of resin.

6. The game ball of claim 1 including a foamed polyurethane center which fills the inside of said shell.

7. The game ball of claim 1 including a cover surrounding said shell.

8. The game ball of claim 1 in which said shell includes about 10 percent by weight of beads having a diameter of about 10 to 150 microns.

* * * * *